United States Patent [19]

Kadokura et al.

[11] Patent Number: 6,010,774
[45] Date of Patent: Jan. 4, 2000

[54] ELECTRODEPOSITION COATED MEMBER

[75] Inventors: Susumu Kadokura; Tomoaki Kato, both of Iwai, Japan

[73] Assignee: Canon Kabushiki Kaisha, Tokyo, Japan

[21] Appl. No.: 08/912,919

[22] Filed: Aug. 15, 1997

[30] Foreign Application Priority Data

Aug. 26, 1996 [JP] Japan .................................. 8-223710

[51] Int. Cl.⁷ .................................................. B32B 27/00
[52] U.S. Cl. .......................... 428/220; 428/332; 204/508
[58] Field of Search .................... 427/457, 458; 428/220, 332; 204/508

[56] References Cited

U.S. PATENT DOCUMENTS

| | | | |
|---|---|---|---|
| 4,532,172 | 7/1985 | Fujiyama | 428/212 |
| 5,326,454 | 7/1994 | Engelhaupt | 205/67 |
| 5,451,306 | 9/1995 | Nakamura et al. | 204/503 |

FOREIGN PATENT DOCUMENTS 4237959A  5/1994  Germany .

OTHER PUBLICATIONS

Database WPI, Week 9517, Derwent Publications Ltd., London. GB; An 125993 XP002075986 "Anion Mat Electrodeposit Paint Resin Compositions durable Coat Surface", Aug. 1993

Database WPI, Week 9336, Derwent Publications Ltd., London, GB; AN 285562 XP002075985 "Porous Silica Sol Preparation fill Antireflective FIlm ", Feb. 1995.

*Primary Examiner*—Kishor Mayekar
*Attorney, Agent, or Firm*—Fitzpatrick, Cella, Harper & Scinto

[57] ABSTRACT

An electrodeposition coated member has a substrate and an electrodeposition coating film formed thereon by electrophoretic action using an electrodeposition coating material comprised of a resin and fine particles dispersed therein. The electrodeposition coating film has a surface roughness of from 1.7 μm to 5 μm.

7 Claims, 8 Drawing Sheets

ELECTRODEPOSITION COATED MEMBER

BACKGROUND OF THE INVENTION

1. Field of the Invention

This invention relates to an electrodeposition coated member and an electrodeposition coating material which are suited for light-screening or anti-reflection on products such as optical instruments, electronic instruments, acoustic instruments, communication instruments, household appliances or office appliances.

2. Related Background Art

As conventional methods for forming light-screening or light-reflection preventing coating films, spray coating had been prevalent.

In such conventional methods, however, light-screening fillers or reflection preventive fillers may come off after coating to create dust, bringing about a great problem in the quality of the final products.

SUMMARY OF THE INVENTION

Accordingly, an object of the present invention is to provide a light-screening member or a reflection preventive member having superior adhesion to substrates and having superior light-screening properties or reflection preventive properties, and an electrodeposition coating material used therefor.

The present invention is an electrodeposition coated member comprising a substrate and an electrodeposition coating film formed thereon by electrophoretic action using an electrodeposition coating material comprised of a resin and fine particles dispersed therein; the electrodeposition coating film has a surface roughness of from 1.7 $\mu$m to 5 $\mu$m.

In the present invention, the electrodeposition coating film is endowed with light-screening properties or reflection preventive properties, whereby a coated member having superior adhesion to substrates and also having superior light-screening properties or reflection preventive properties can be formed. The electrodeposition coating film achieves these properties by making the electrodeposition coating film have a surface roughness (Ra; center-line average roughness) of as great as 1.7 to 5 $\mu$m. Such a surface roughness attained in the step of electrodeposition contributes to the prohibition of incident light from reflecting. Addition of a black colorant can achieve a superior light-screening performance.

DESCRIPTION OF THE PREFERRED EMBODIMENTS

Figure 1:
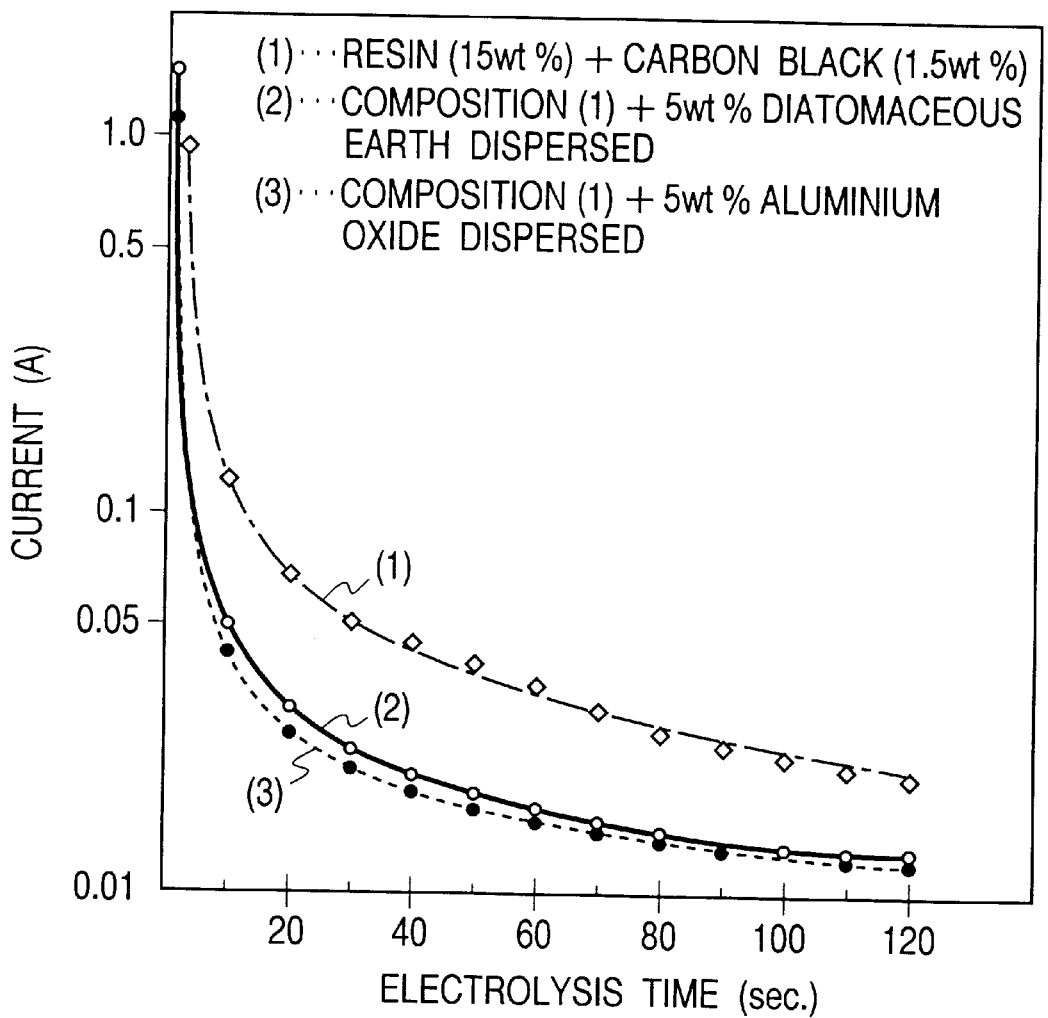
FIG. 1 is a graph showing current-time curves in the step of electrodeposition.

One of phenomena in which the electrodeposition coating film according to the present invention exhibits good light-screening properties or reflection preventive properties is shown in FIG. 1 by the current-time curves of electrodeposition.

FIG. 1 shows a comparison of deposition reactions between 1) an instance where an electrodeposition coating film is formed on a zinc phosphite-coated steel sheet by using a electrodeposition coating material comprised of a resin and carbon black dispersed therein as a pigment, and 2) instances where electrodeposition coating films are formed by using electrodeposition coating materials with porous fine particles further dispersed therein, which is indicated by current-time curves.

In FIG. 1, a curve 1 in a circle shows an instance where "resin (15 wt. %)+carbon black (1.5 wt. %)" (the balance being water) is used for comparison in Example 1, and curves 2 and 3 in circles show embodiments according to the present invention. Electrodeposition is carried out at 100 V for 2 minutes.

As can be seen from FIG. 1, electrodeposition coating films formed using the electrodeposition coating materials of the present invention are dense and have a superior uniformity. More specifically, the current-time curves in the case when the porous fine particles are dispersed in the resin and co-deposited come much nearer to the X axis than in the case when they are not deposited together.

This behavior is seen when electrodeposition coating films are densely formed and have a high film resistance. This phenomenon greatly contributes to the light-screening or anti-reflection to light.

The current-time curves do not change based on the amount of the porous fine particles dispersed. In the electrodeposition coating material, the porous fine particles may be contained in an amount ranging from 5 parts by weight to 60 parts by weight based on 100 parts by weight of the resin.

The porousness of the fine particles is evaluated by porosity (%), which is calculated according to the following expression (1).

$$\text{Porosity } (\%) = (1 - s/d) \times 100 \qquad (1)$$

wherein s is an apparent specific gravity (density), and d is a true specific gravity (density).

For example, when porous fine particles of aluminum oxide have a d-value of 3.8 and an s-value of 1, the aluminum oxide particles have a porosity of 73.1%.

In the present invention, the electrodeposition coating film is formed using the electrodeposition coating material comprised of a resin capable of being electrodeposited (electrodepositable resin) and the fine particles dispersed therein, on a metallic or non-metallic substrate by electrophoretic electrodeposition coating methods.

In the case when the substrate is made of a non-metallic material such as resin, the electrodeposition coating is carried out after the substrate has been subjected to metal coating by chemical plating, or to suitable treatment to make its surface conductive.

The resin used in the electrodeposition coating material includes anionic or cationic resins of an acrylic melamine type, an acrylic type, an epoxy type, a urethane type or an alkyd type.

As the anionic resin, for example, a resin such as acrylic resin, maleic resin, polyester resin, epoxy resin or polybutadiene resin into which an anionic group such as a carboxyl group or sulfonic group has been introduced may be used. In the electrodeposition coating material, such a resin is made water-soluble or dispersed by the aid of a basic substance such as triethylamine, diethylamine, dimethyl ethanol or ammonia.

As the cationic resin, for example, a resin such as epoxy resin, acrylic resin, urethane resin, polyamide resin or polybutadiene resin into which a cationic group such as an amino group, an ammonium group or an imino group has been introduced may be used. In the electrodeposition coating material, such a resin is made water-soluble or dispersed by the aid of an acidic substance such as formic acid, acetic acid, propionic acid or lactic acid.

In the anionic system, the masked substrate side is set as the anode, and in the cationic system as the cathode, to make electrification.

In this electrification process, the anionic resin moves to the surface of the substrate anode and reacts with the acid ($H^+$) produced in the vicinity of the anode as a result of the electrolysis of water to become deposited as the electrodeposition coating film. As for the cationic resin, it moves to the surface of the substrate cathode and reacts with the base ($OH^-$) produced in the vicinity of the cathode as a result of the electrolysis of water to become deposited as the electrodeposition coating film. Subsequently, the substrate is taken out of the electrodeposition bath, and is washed with water, followed by hydro-extraction. The electrodeposition coating film thus formed may preferably be further cured by heating or by irradiation with light to improve its weatherability and chemical resistance. In the case of the anionic resin, the anionic resin is cured by allowing hydroxyl groups or methylolated amide groups introduced into the anionic resin, to react with an amino resin such as melamine resin or benzoguanamine resin. Here, the amino resin acts as a cross-linking agent. Also, the anionic resin may be cured by coordination polymerization utilizing its double bonds. In the case of cationic polymerization, for example, the cationic resin is cured by a curing method in which hydroxyl groups of the cationic resin or amino groups introduced to make the resin cationic are allowed to react with an isocyanate compound, a curing method carried out by oxidation polymerization, or a curing method carried out by ester interchange reaction.

Figure 2:
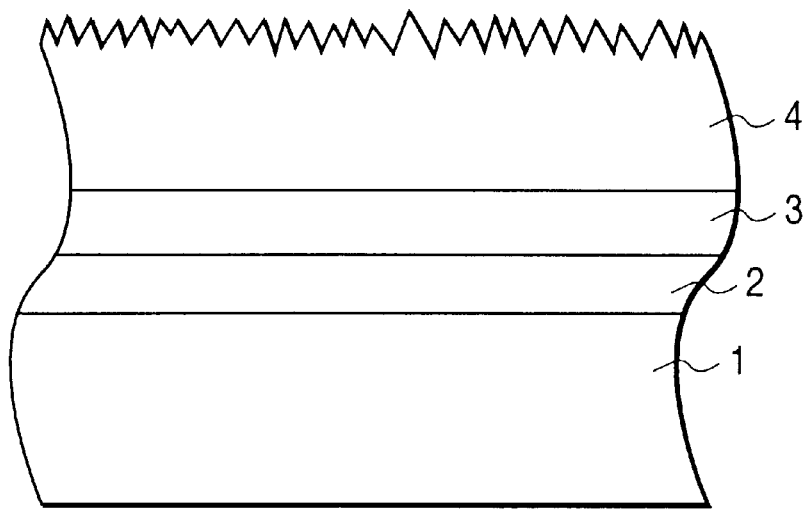
FIG. 2 is a diagrammatic cross-section of an electrodeposition coated member according to the present invention.
Figure 3:
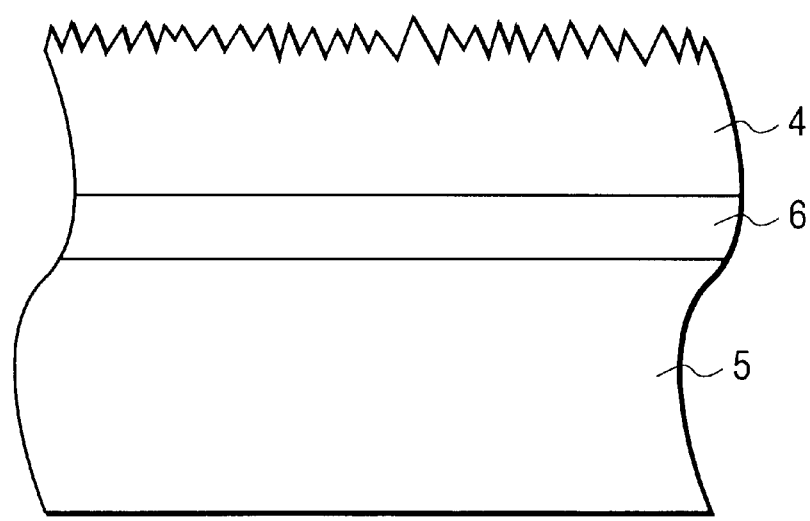
FIG. 3 is a diagrammatic cross-section of another electrodeposition coated member according to the present invention.

FIGS. 2 and 3 show typical examples of the construction of the electrodeposition coated member according to the present invention.

FIG. 2 is a cross-section thereof, where on the surface of a plastic material 1 a metallic coating 2 is formed by a commonly known plating process carried out on plastic materials, the surface skin of the metallic coating is chemically treated to form a chemical conversion coating 3, and an electrodeposition coating film 4 is formed on its surface. The chemical conversion coating is exemplified by, when the metallic coating is formed of copper, a copper oxide film obtained by subjecting it to oxidation treatment.

FIG. 3 is a cross-section of another electrodeposition coated member, where on the surface of a metallic material 5 a metallic coating or chemical conversion coating 6 is formed by a commonly known plating process or chemical conversion process, and an electrodeposition coating film 4 is formed on its surface.

The metallic coating or chemical conversion coating, however, may be omitted. Thus, the electrodeposition coated member is provided with a coating film surface greatly roughened by the effect of codeposition of porous fine particles, so that the light-screening properties or antireflection to light can be improved. It is also possible to form an electrodeposition coated member having a hard electrodeposition coating film of course, and having a high scratch resistance, a high weatherability, a high adhesion and a high solvent resistance.

The electrodeposition coating film may preferably have a surface roughness of from 2 to 4.5 $\mu$m. The surface roughness of the electrodeposition coating film may preferably be as dense as possible, and the number of roughness peaks whose distance from an average line of a roughness curve is 2.5 $\mu$m or larger may be 30 or more, and particularly preferably 40 or more. The number of roughness peaks is a number given by adding the number of hill peaks and the number of valley peaks with reference to an average line.

The light-screening properties or reflection preventive surface-finished electrodeposition coated member of the present invention may typically be constituted using as the substrate a plastic material or a metallic material. When the plastic material is used, a copper or nickel coating is formed using a commonly known plating process carried out on plastic materials.

With regard to the metallic material, a metallic coating or chemical conversion coating is formed by a commonly known plating process or chemical conversion process. The step of plating or chemical conversion may be omitted as occasion calls. With regard to an aluminum material, it may be treated by anodizing or the like.

Next, as the electrodeposition coating material for endowing the surface of the substrate with the light-screening properties and reflection preventive properties, it may be comprised of i) an electrodepositable resin commonly commercially available or an electrodepositable resin containing a low-temperature curing agent, preferably including resins such as acrylic resins, acrylic melamine resins, epoxy resins and urethane resins, and ii) the fine particles dispersed therein.

The fine particles may include, for example, fine particles of aluminum oxide, diatomaceous earth, activated carbon, zirconium oxide, porous carbon or silicic acid compounds, and those having a porosity of 80% or higher are preferred. In particular, silicic acid compounds are preferred.

The fine particles have different glossiness depending on the size of particles, and have a tendency to have a higher glossiness with a decrease in size and have a lower glossiness with an increase in size. If they have a size exceeding the limit, the particles may come off to cause the problem of dust after products are completed. Thus, the fine particles may preferably have an average particle diameter of from 5 to 70 $\mu$m, and particularly from 10 to 40 $\mu$m. The particle diameter of the particles is a value measured using a centrifugal settling type particle size distribution measuring device. What is actually used as this measuring device is SACP-3 (manufactured by Shimadzu Corporation).

The amount of fine particles to be dispersed in the electrodeposition coating film correlates with the percentage of resin content. If the fine particles are in excess, the excessive fine particles may come off to cause the problem of dust after products are completed. If they are used in a too small a quantity, they have a high gloss. Thus, they may preferably be dispersed in an amount ranging from 2 to 50 parts by weight, and particularly from 5 to 40 parts by weight, based on 100 parts by weight of the resin. With regard to the shape, the fine particles may either have definite form or lack definite form (amorphous). These are put into a container in a prescribed amount together with the resin, and are dispersed by means of a ball mill for 24 hours or longer, followed by dilution with desalted water to have a solid content of preferably from 5 to 20% by weight, and particularly from 7 to 17% by weight. Thereafter, a pigment is optionally added and the pH is adjusted to from 7.5 to 8.5. Thus, the electrodeposition coating material is made up.

Next, to produce the light-screening and reflection preventive electrodeposition coated member, the coating object (substrate) is set as the anode against the opposite electrode in the case of anionic electrodeposition coating, and the coating object is set as the cathode in the case of cationic electrodeposition coating, where the coating object is treated at a bath temperature ranging from 20 to 25° C., under application of a voltage of from 70 to 200 V as occasion calls, at a current density of from 0.5 to 5 A/cm$^2$ and for a treatment time of from 1 to 5 minutes to form a electrodeposition coating film, followed by washing with water and then curing at a temperature ranging from 70 to 200° C. for 20 to 120 minutes. In this instance, the electrodeposition coated member can have the coating film with any desired thickness of from 10 to 50 $\mu$m. In this instance, the porous fine particles may preferably be contained in the coating film in an amount of from 7 to 50% by weight, and particularly from 10 to 40% by weight.

As described above, in the present invention, the electrodeposition coating film is formed using the electrodeposition coating material comprised of the resin and the fine particles dispersed therein, to thereby bring out the effect of codeposition to greatly promote the light-screening properties or reflection preventive properties to light. Light-screening or reflection preventive effect was measured using a gloss meter to obtain the result that the surface had a glossiness of from 0 to 2 at an angle of 60°. What was actually used as the measuring device was GLOSS METER UGS-300A (manufactured by Nippon Denshoku Kogyo).

In respect of physical properties of the coating film, for example, it causes no dust resulting from fine particles coming off, which may be seen in coating films formed by spray coating, has no problem on adhesion and also has a hardness of 3H or higher. With regard to solvent resistance, it causes no change even against methyl ethyl ketone, and has a weatherability of 1,000 hours or more.

The codeposition quantity of the fine particles is measured by thermogravimetry. The codeposition quantity of the fine particles is also ascertained using an X-ray microanalyzer. Ra is measured using SURFCOM, manufactured by Tokyo Seimitsu K.K.

The electrodeposition coated member according to the present invention can be applied in products including lens tubes for cameras or steppers and also all sorts of parts for which light-screening or anti-reflection is required.

As the black colorant added to bring about light-screening properties, materials having superior light absorption characteristics may be used, as exemplified by carbon black, titanium oxide and magnetite.

In the case when no black colorant is contained in the electrodeposition coating film, the electrodeposition coated member can be used as a member having superior reflection preventive properties and appearance.

EXAMPLES

Example 1

To 15% by weight of an acrylic melamine type clear resin (trade name: HONEY BRIGHT H-1, available from Honey Chemical Co.) or 15% by weight of an acrylic melamine type clear resin (trade name: HONEY BRIGHT C-1L, available from Honey Chemical Co.), particles of aluminum oxide with a porosity of 73%, having an average particle diameter of 10 $\mu$m, and particles of diatomaceous earth (trade name: PRELITE #4, available from Sanshin Seisakusho K.K.) with a porosity of 85%, having an average particle diameter of 10 $\mu$m, were each separately added in an amount of 5% by weight in weight ratio, and were dispersed using a ball mill for 24 hours, followed by dilution with desalted water so as to be 2 liters in total volume. In order to obtain a black coating film, 1.5% by weight of carbon black was further added as a black pigment. Thus, electrodeposition coating materials were obtained.

Meanwhile, to compare the codeposition effect attributable to the porous fine particles, an electrodeposition coating material containing no such fine particles was also produced.

The electrodeposition coating was carried out under conditions of a bath pH of 8.0 to 8.2 and a bath temperature of from 20 to 25° C. The coating object was set as the anode, and a stainless steel of 0.5 mm thick was used as the opposite electrode. A voltage was applied from a DC current power source at 50 V at minimum and 200 V at maximum, raised at intervals of 25 V. Under such conditions, as test pieces, steel sheets of 50 mm long, 100 mm broad and 0.5 mm thick having been treated with zinc phosphite were each surface-degreased with an alkali degreasing agent (trade name: BACNA, available from Yuken Industry Co., Ltd.), and then thoroughly washed with water. Thereafter, the electrodeposition coating was carried out for 2 minutes at each applied voltage. Next, the coating films thus formed were washed with water and finally washed with desalted water, followed by baking for 30 minutes in an electric furnace having an atmosphere of 95° C. plus or minus 1° C. or 150° C. plus or minus 1° C. to complete the preparation of test pieces.

Gloss, Ra, number of roughness peaks, codeposition quantity of fine particles in electrodeposition coating films of the test pieces thus completed were measured to obtain the results as shown in Table 1.

The electrodeposition coating material comprised of resin and carbon black and the alumina-dispersed electrodeposition coating material did not show or did not sufficiently show the expected effect.

The baking at 95° C. plus-minus 1° C. was carried out on coating films formed in the bath containing HONEY BRIGHT C-1L, and that at 150° C. plus or minus 1° C. on those formed in the bath containing HONEY BRIGHT H-1, but there was no difference in coating film characteristics (inclusive of 1,000-hour weatherability).

TABLE 1

Figure 4:
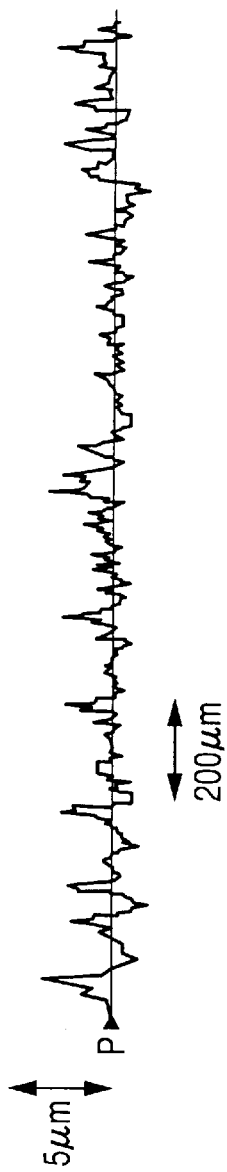
FIG. 4 shows a roughness curve of an electrodeposition coating film.
Figure 5:
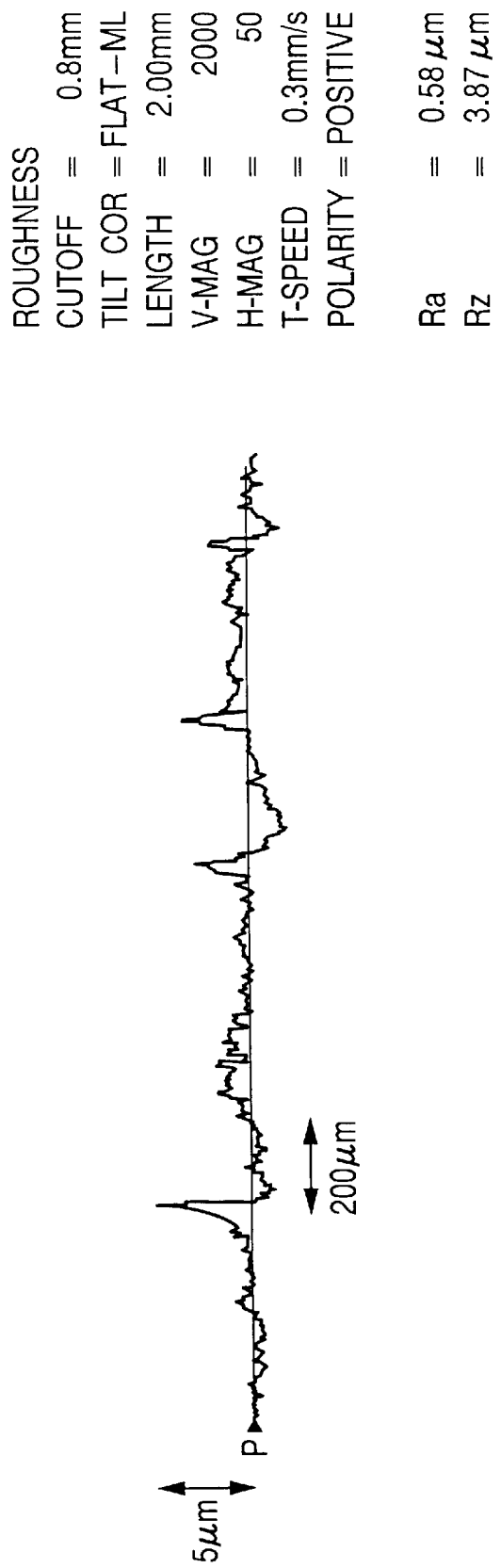
FIG. 5 shows a roughness curve of an electrodeposition coating film.
Figure 6:
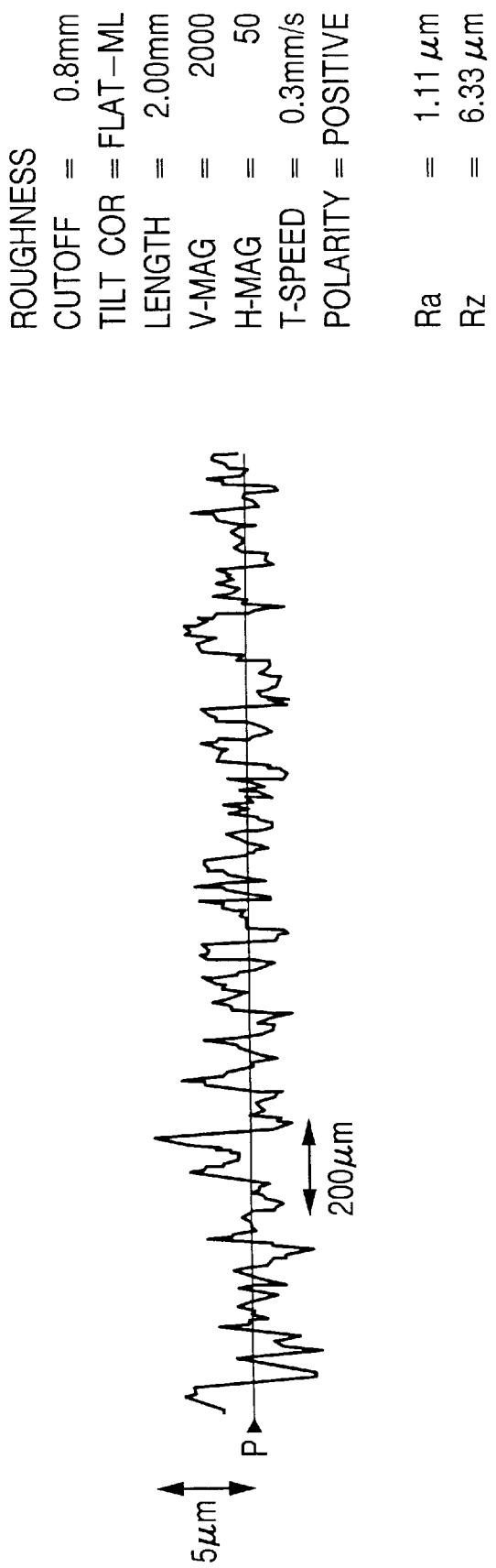
FIG. 6 shows a roughness curve of an electrodeposition coating film.

| Voltage (V) | Gloss | Ra ($\mu$m) | Number of roughness peaks | Codeposition quantity of fine particles (wt. %) |
|---|---|---|---|---|
| Composition (1): Resin (15 wt. %) + carbon black (1.5 wt. %) | | | | |
| 50 | 21 | 0.22 | 0 | 0 |
| 75 | 21 | 0.25 | 0 | 0 |
| 100 | 25 | 0.27 | 0 | 0 |
| 125 | 27 | 0.13 | 0 | 0 |
| 150 | 30 | 0.15 | 0 | 0 |
| 175 | 30 | 0.17 | 0 | 0 |
| 200 | 30 | 0.17 | 0 | 0 |
| Composition (2): Composition (1) + aluminum oxide (15 wt. %) dispersed | | | | |
| 50 | 21 | 0.31 | 1 | 1 |
| 75 | 17 | 0.58 | 2(FIG. 4) | 5 |
| 100 | 15 | 0.58 | 3(FIG. 5) | 10 |
| 125 | 7 | 0.72 | 3 | 20 |
| 150 | 5 | 1.15 | 13(FIG. 6) | 30 |

TABLE 1-continued

Figure 7:
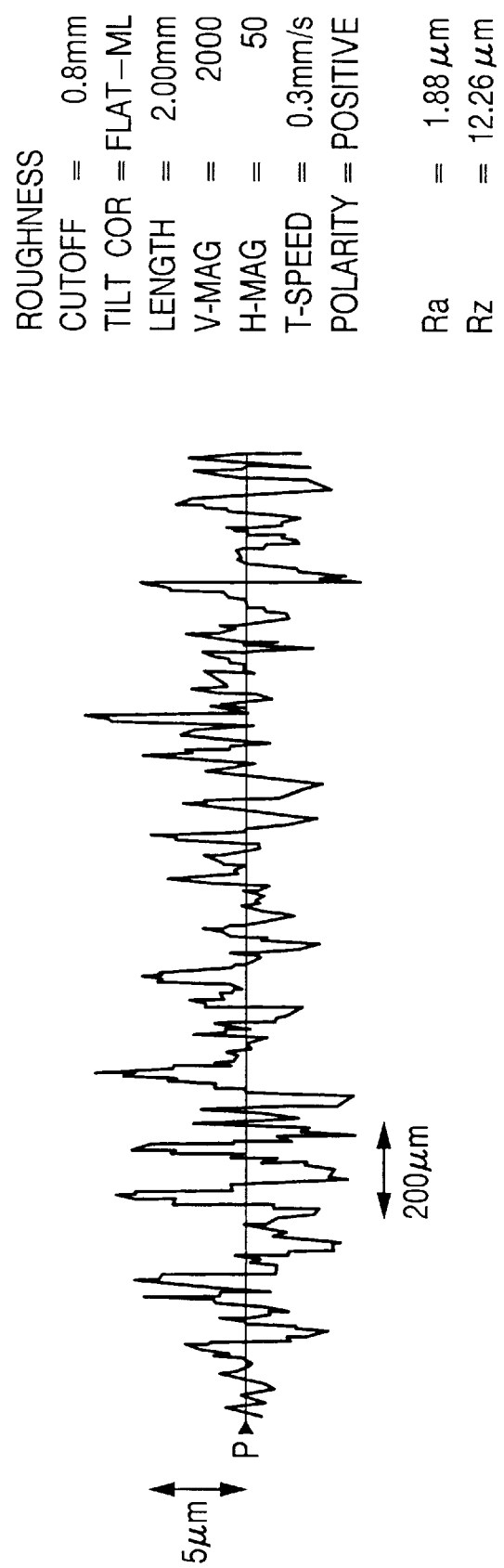
FIG. 7 shows a roughness curve of an electrodeposition coating film.
Figure 8:
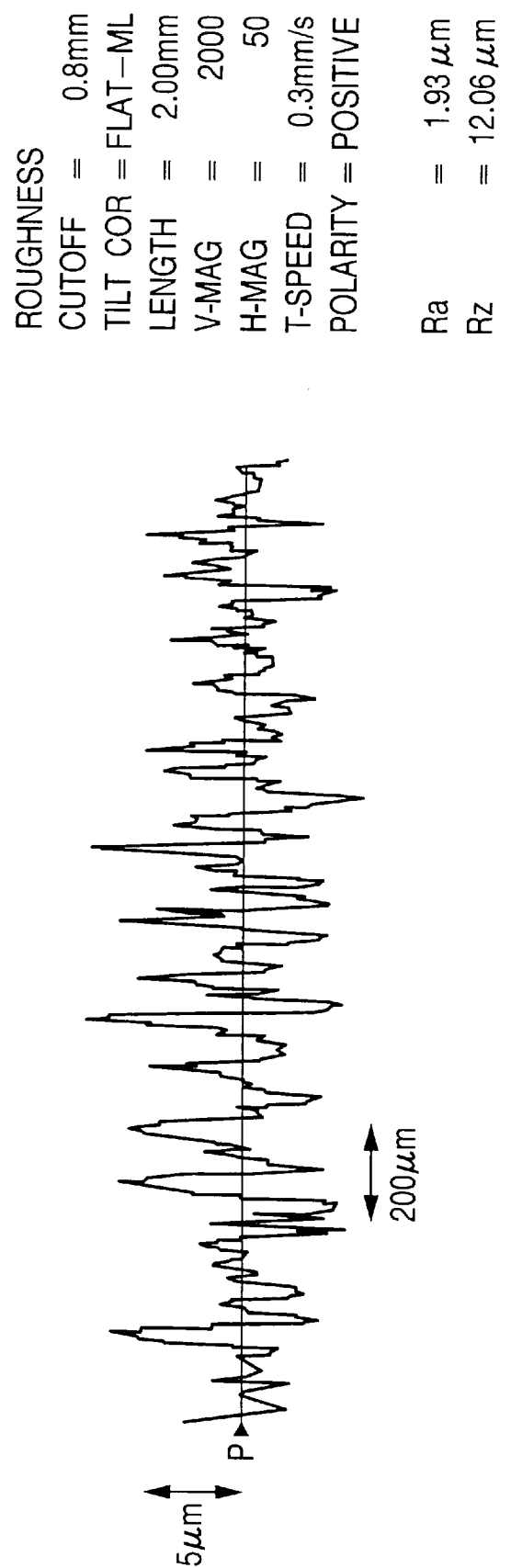
FIG. 8 shows a roughness curve of an electrodeposition coating film.
Figure 9:
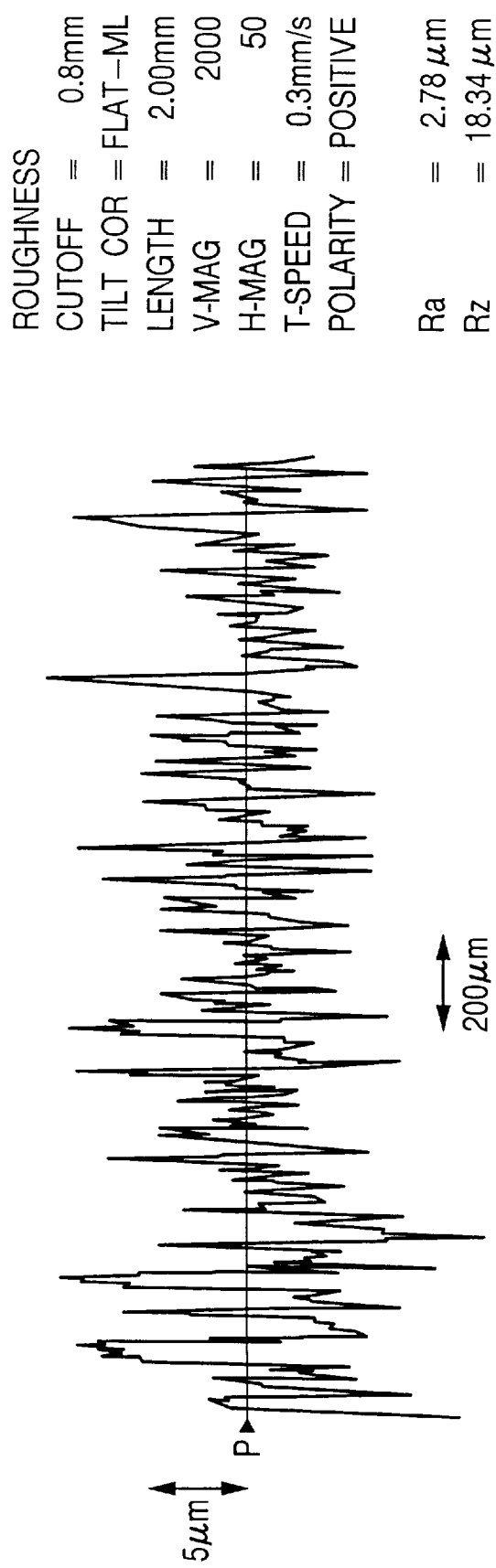
FIG. 9 shows a roughness curve of an electrodeposition coating film.

| Voltage (V) | Gloss | Ra (µm) | Number of roughness peaks | Codeposition quantity of fine particles (wt. %) |
|---|---|---|---|---|
| 175 | 5 | 1.33 | 15 | 40 |
| 200 | 5 | 1.36 | 15 | 50 |
| Composition (3): Composition (1) + diatomaceous earth (5 wt. %) dispersed | | | | |
| 50 | 2 | 1.81 | 36(FIG. 7) | 1 |
| 75 | 2 | 1.93 | 35(FIG. 8) | 5 |
| 100 | 1-0 | 2.78 | 78(FIG. 9) | 10 |
| 125 | 1-0 | 3.21 | 81 | 15 |
| 150 | 0 | 4.36 | 87 | 20 |
| 175 | 0 | 4.78 | 90 | 30 |
| 200 | 0 | 4.75 | 95 | 50 |

Roughness curves in electrodeposition coating carried out at voltages 75 V, 100 V and 150 V under composition (2) and at voltages 50 V, 75 V and 100 V under composition (3) are shown in FIGS. 4 to 9, respectively.

Example 2

To 15% by weight of an acrylic melamine type clear resin (trade name: HONEY BRIGHT C-1L, available from Honey Chemical Co.), particles of diatomaceous earth (trade name: PRELITE #40, available from Sanshin Seisakusho K.K.) with a porosity of 85% and particles of activated carbon (trade name: FM-150, available from Cataler Industrial Co., Ltd.) with a porosity of 85%, both having an average particle diameter of 25 µm, were each separately added in an amount of 10% by weight in weight ratio, and were dispersed using a ball mill for 24 hours, followed by dilution with desalted water so as to be 2 liters in total volume. In order to obtain a black coating film, 1.5% by weight of carbon black was further added as a black pigment. Thus, electrodeposition coating materials were obtained.

The electrodeposition coating was carried out under conditions of a bath pH of 8.0 to 8.2 and a bath temperature of from 20 to 25° C. The coating object was set as the anode, and a stainless steel of 0.5 mm thick was used as the opposite electrode. A DC voltage was applied at 50 V at minimum and 200 V at maximum, raised at intervals of 25 V. Under such conditions, as test pieces, plastic materials (ABS/PC) of 50 mm long, 100 mm broad and 1.0 mm thick were surface-degreased and thereafter treated with a chromic acid/sulfuric acid/water type etchant at 70° C. for 10 minutes. Subsequently, these were treated with a sensitizer solution composed of 30 g/l of stannous chloride and 20 ml/l of hydrochloric acid, at room temperature for 2 minutes, and their surfaces were treated with palladium as catalytic treatment to make them conductive, followed by treatment in an electroless copper plating bath (trade name: OPC700, available from Okuno Chemical Industries Co., Ltd.) at a bath temperature of 50° C. for 2 hours to form a coating having 5 µm thickness on each surface. Then, the coating was treated with an alkaline solution at bath temperature of 50° C. for 1 minute to form a chemical conversion coating on copper-plating surface, and the electrodeposition coating was carried out for 2 minutes at each applied voltage. Thereafter, the coating films thus formed were washed with water and finally washed with desalted water, followed by baking for 30 minutes in an electric furnace having an atmosphere of 95° C. plus or minus 1° C. to complete the preparation of test pieces.

Gloss, Ra, number of roughness peaks, codeposition quantity of fine particles of the test pieces thus obtained were measured to obtain the results as shown in Table 2.

TABLE 2

| Voltage (V) | Gloss | Ra (um) | Number of roughness peaks | Codeposition quantity of fine particles (wt. %) |
|---|---|---|---|---|
| Composition (4): Composition (1) + diatomaceous earth (10 wt. %) dispersed | | | | |
| 50 | 2-1 | 2.00 | 31 | 2 |
| 75 | 1 | 2.51 | 40 | 7 |
| 100 | 1-0 | 2.74 | 70 | 12 |
| 125 | 1-0 | 3.03 | 79 | 16 |
| 150 | 0 | 4.23 | 85 | 20 |
| 175 | 0 | 4.34 | 87 | 37 |
| 200 | 0 | 4.50 | 90 | 50 |
| Composition (5): Composition (1) + activated carbon (10 wt. %) dispersed | | | | |
| 50 | 3 | 1.68 | 29 | 3 |
| 75 | 2-1 | 1.91 | 32 | 5 |
| 100 | 1 | 2.63 | 35 | 7 |
| 125 | 1 | 2.65 | 35 | 10 |
| 150 | 1-0 | 2.92 | 41 | 15 |
| 175 | 1-0 | 3.01 | 41 | 20 |
| 200 | 1-0 | 3.13 | 48 | 30 |

What is claimed is:

1. An electrodeposition coated member comprising a substrate and an electrodeposition coating film formed thereon by electrophoretic action using an electrodeposition coating material comprised of a resin and fine particles dispersed therein, wherein said fine particles have a porosity of 80% or higher; said electrodeposition coating film having a surface roughness of from 1.7 µm to 4.5 µm and the number of roughness peaks whose distance from an average line of a roughness curve is 2.5 µm or larger is 30 or more.

2. The electrodeposition coated member according to claim 1, wherein said electrodeposition coating film has a surface roughness of from 2 µm to 4.5 µm.

3. The electrodeposition coated member according to claim 1, wherein said number of roughness peaks is 40 or more.

4. The electrodeposition coated member according to claim 1, wherein said fine particles comprise a silicic acid compound.

5. The electrodeposition coated member according to claim 1, wherein said fine particles have an average particle diameter of from 5 µm to 70 µm.

6. The electrodeposition coated member according to claim 1, wherein said electrodeposition coating material contains a black colorant for imparting light-screening properties to said electrodeposition coating film.

7. The electrodeposition coated member according to claim 6, wherein said electrodeposition coating film has a surface glossiness of 2 or below.

* * * * *

UNITED STATES PATENT AND TRADEMARK OFFICE
CERTIFICATE OF CORRECTION

PATENT NO.  : 6,010,774
DATED       : January 4, 2000
INVENTOR(S) : SUSUMU KADOKURA ET AL.

Page 1 of 2

It is certified that error appears in the above-identified patent and that said Letters Patent is hereby corrected as shown below:

ON TITLE PAGE

[56] References Cited, under OTHER PUBLICATIONS:
"Database WPI, Week 9517, Derwent Publications Ltd., London. GB; An 125993 XP002075986 "Anion Mat Electrodeposit Paint Resin Compositions durable Coat Surface", Aug. 1993
Database WPI, Week 9336, Derwent Publications Ltd., London, GB; AN 285562 XP002075985 "Porous Silica Sol Preparation fill Antireflective FIlm", Feb. 1995." should read --Database WPI, Week 9517, Derwent Publications Ltd., London, GB; AN 125993 XP002075985," Porous Silica Sol Preparation Fill Antireflective Film", Feb. 1995.
Database WPI, Week 9336, Derwent Publications Ltd., London, GB; AN 285562 XP002075986 "Anion Mat Electrodeposit Paint Resin Composition Durable Coat Surface, Aug. 1993.--.

UNITED STATES PATENT AND TRADEMARK OFFICE
CERTIFICATE OF CORRECTION

PATENT NO.    : 6,010,774
DATED         : January 4, 2000
INVENTOR(S)   : SUSUMU KADOKURA ET AL.

It is certified that error appears in the above-identified patent and that said Letters Patent is hereby corrected as shown below:

COLUMN 5

Line 15, "a" should read --an--.

COLUMN 6

Line 38, "plus-minus" should read --plus or minus--.

Signed and Sealed this

Thirteenth Day of March, 2001

Attest:

NICHOLAS P. GODICI

Attesting Officer

Acting Director of the United States Patent and Trademark Office